United States Patent [19]

Ono

[11] Patent Number: 4,985,912
[45] Date of Patent: Jan. 15, 1991

[54] RADIO TELEPHONE DEVICE

[75] Inventor: Koji Ono, Hachioji, Japan

[73] Assignee: Kabushiki Kaisha Toshiba, Kawasaki, Japan

[21] Appl. No.: 250,451

[22] Filed: Sep. 28, 1988

[30] Foreign Application Priority Data

Sep. 30, 1987 [JP] Japan .................................. 62-246792

[51] Int. Cl.⁵ .............................................. H04Q 7/04
[52] U.S. Cl. .......................................... 379/61; 379/58
[58] Field of Search ..................... 379/58–63, 379/164, 381–382, 386, 396, 131, 359

[56] References Cited

U.S. PATENT DOCUMENTS

| 4,056,696 | 11/1977 | Meyerle et al. ........................ 379/58 |
| 4,277,651 | 7/1981 | Fisher, II et al. .................... 379/359 |
| 4,459,432 | 7/1984 | Hashimoto ........................... 379/131 |
| 4,656,657 | 4/1987 | Hunsicker ........................... 379/131 |
| 4,691,338 | 9/1987 | Makano ................................ 379/61 |
| 4,736,410 | 4/1988 | Nishida et al. ....................... 379/58 |
| 4,768,218 | 8/1988 | Yorita .................................. 379/63 |
| 4,776,001 | 10/1988 | Murata et al. ........................ 379/62 |

Primary Examiner—James L. Dwyer
Assistant Examiner—M. W. Shehata
Attorney, Agent, or Firm—Finnegan, Henderson, Farabow, Garrett, and Dunner

[57] ABSTRACT

A radio telephone device consists of a base unit connected to a wire circuit and a radio telephone connected to the base unit via a radio circuit, and can perform dialing under an on-hook state from the radio telephone. In the base unit there is provided a detector for detecting a state of the wire circuit, and in the radio telephone there are provided an on-hook dialing switch for indicating on-hook dialing and a display unit for visually displaying a state of the wire circuit according to an output of the detector on the occasion of the on-hook dialing.

12 Claims, 8 Drawing Sheets

RADIO TELEPHONE DEVICE

BACKGROUND OF THE INVENTION

1. Field of the Invention

This invention relates to a radio telephone device consisting of a base unit connected to wire circuits such as subscribers' lines and a radio telephone connected to the base unit via a radio circuit, and more particularly to a radio telephone device which is capable of dialing udner on-hook state from the radio telephone.

2. Description of the Related Art

The following is an example of a radio telephone device consisting of a base unit connected to wire circuits and a radio telephone connected to the base unit via a radio circuit. FIG. 7 illustrates the configuration thereof, which consists of a base unit 2 connected to a subscriber's line 1 and a radio telephone 4 connected to the base unit 2 via a radio circuit 3.

The base unit 2 includes a transmitter (TX) 22 for which a transmitting and receiving channel is allocated by a synthesizer (SYN) 21 and a receiver (RX) 23, modulates talking signals arrived from the terminal of a correspondent for conversation via the subscriber's line 1 during conversation by said transmitter 22 after passing through a line relay 24 and a hybrid circuit 25 to sent out to the radio circuit 3 from a transmitting antenna 26. At the same time, the base unit 2 demodulates radio talking signals arrived from the radio telephone 4 via the radio circuit 3 by the receiver 23 via a receiving antenna 27, and then sends out to the subscriber's line 1 via said hybrid circuit 25 and line relay 24. The base unit 2 also includes, as circuits necessary for the connection between the subscriber's line 1 and the radio telephone 4, a signal reception-detection circuit 28 for detecting 16 Hz calling signals arriving from a switchboard, a received electric field-detection circuit (C-DET) 29, an identifying signal-detection circuit (ID-DET) 30 and a control circuit (CONT) 31. The received electric field-detection circuit 29 consists of a carrier squelch circuit or a noise squelch circuit, which monitors the arrival of radio waves from the radio telephone 4. The identifying signal-detection circuit 30 collates an identifying signal (ID code) which as been predetermined by a combination of the base unit 2 and the radio telephone 4, and notifies the result of the collation to the control circuit 31. The control circuit 31 includes, for example, a microcomputer as a main control unit, and performs various connection controls. A rectified stabilizing circuit 32 supplies a predetermined operating voltage Vcc from the commercial power supply output to each circuit in the base unit 2, and at the same time supplies the same as a charging voltage to the radio telephone 4 via a feeding terminal 33.

On the other hand, the radio telephone 4 includes a transmitter (TX) 42 for which a transmitting and receiving channel is allocated by a synthesizer (SYN) 41 and a receiver (RX) 43 like said base unit 2, receives and demodulates radio talking signals arrived via the radio circuit 3 during conversation by the receiver 43 via a receiving antenna 44 to subsequently output as sounds from the receiver 45, and at the same time demodulates talking signals input from a transmitter 46 by the transmitter 42, and subsequently sends out to the radio circuit 3 via a transmitting antenna 47.

A display unit 57 which uses a liquid crystal display and the like for the element thereof is for displaying the dial number and the like of a subscriber in correspondence input by a dial key 49.

This radio telephone 4 also includes, as circuits necessary for the connection between said base unit 2 and a switchboard, a dialing switch 48, a dial key 49, a received electric field-detection circuit (C-DET) 50, an identifying signal-detection circuit (ID-DET) 51, A control circuit (CONT) 52 which performs various connection controls with a microcomputer as a main control unit, and a sounder 53 which generates ringing. A battery 54 is charged by the operating voltage Vcc fed from said base unit 2 via a charging terminal 55.

Under such a configuration, when signal reception occurs, the base unit 2 detects the occurrence of the signal reception by the signal reception-detection circuit 28, indicates an unoccupied transmitting and receiving channel to the synthesizer 21 by the control circuit 31 to operate the transmitter 22 and the receiver 23, respectively, and sends out an ID code and a reception signal to the radio telephone 4.

Meanwhile, the radio telephone 4 is performing intermittent receiving operation during standby by the receiver 43, and when radio waves arrive from the base unit 2 under this state, the radio telephone 4 detects the same with the received electric field-detection circuit 50, and at the same time colates the ID code sent from the base unit 2 by the identifying signal-detection circuit 51. When the radio telephone 4 judges after the result of the collation that the signal reception is to the own device, it indicates the transmitting and receiving channel to the synthesizer 41 by the control circuit 52 to make the transmitter 42 and the receiver 43 in continuous operation state, and subsequently retransmits the signal reception response signals to the base unit 2, and at the same time generates a ringback tone signal from the sounder 53 to notice the occurrence of signal reception to the subscriber. When the subscriber responds to this call by turning on the dialing switch 48, the fact is sent out from the transmitter 42 of the radio telephone 4 to the base unit 2, and as a result the base unit 2 turns on the line relay 24. Consequently, the radio telephone 4 is connected to the caller, and hereafter conversation becomes possible between the both parties.

When the subscriber turns on the dialing switch 48 of the radio telephone 4 under standby state, the radio telephone 4 indicates a specified transmitting and receiving channel to the synthesizer 41 by the control circuit 52 to thereby continuously operate the transmitter 42 and the receiver 43, respectively, and at the same time sends out an ID code and a dialing signal. When radio waves have arrived from the radio telephone 4, the base unit 2 detects the same with the received electric field-detection circuit 29, and at the same time collates the ID code by the identifying signal-detection circuit 30. When the base unit 2 recognizes that there is a connection request to the own device after the result of the collation and at the same time confirms the arrival of the dialing signal, it produces a dialing response signal by the control circuit 31 to transmit the signal along with the information on the indication of the transmitting and receiving channel from the transmitter 22 to the radio telephone 4, and thereby makes the radio telephone 4 set the transmitting and receiving channel for conversation. After this control operation, the line relay 24 is turned on to make the d.c. loop of the subscriber's line 1. Further, when the subscriber inputs under this state the telephone number of the correspondent by the dial key 49, the radio telephone 4 sends out that key code data from the transmitter 42 via the radio circuit 3 to the base unit 2.

At this moment the telephone number of the correspondent which has been key input is displayed on the display unit 57, and it is possible to confirm if the telephone number input is correct.

The control circuit 31 of the base unit 2 performs switching control of the line relay 24 in accordance with said key code data to send out dial pulses to the subscriber's line 1. Consequently, calling to the desired correspondent for conversation is performed, and when the called side responds thereto, the connection between the radio telephone 4 and the called side is made thereafter and conversation becomes possible.

That is, by using such a device, it is possible to perform conversation completely in the same way as the case using a normal wire telephone directly connected to the subscriber's line 1.

Now, it has recently been considered to give to this kind of device the so-called on-hook dialing function which can perform calling operation even without approaching the transceiver of the radio telephone 4 to the subscriber's face. In order to perform on-hook dialing, however, it is necessary to prepare a loudspeaker of relatively large size (about 5 cm in diameter) which outputs loudly signals or sounds on the subscriber's line and a driving circuit thereof. On the other hand, the radio telephone 4 is desired to be of small size and light weight in order to be easily portable, and at the same time the consumption current thereof is required to be as small as possible because a battery is used as the power supply thereof. Hence, it has been extremely difficult to give said on-hook dialing function to a radio telephone device.

As described above, the conventional device has disadvantages that it is difficult to be provided with on-hook dialing function, and in the case of providing that function a larger size of the radio telephone and a shorter life of the battery are inevitable. The present invention, in paying attention to this point, intends to provide a radio telephone device which can realize on-hook dialing without causing a larger size of the radio telephone and a shorter life of the battery.

SUMMARY OF THE INVENTION

The present invention comprises an input device for indicating on-hook dialing, a state-detection device for detecting a state of the wire circuit side, a state-transmission device and a state-display controller. In the case that on-hook dialing is indicated by the input device, a state of the wire circuit side is detected by the state-detection device from signals arriving from a switchboard after dialing. At the same time the result of the detection of the state-detection device is transmitted from a base unit via a radio circuit to a radio telephone by the state-transmission means, and the transmitted state of the wire circuit side is displayed on state-display under the control of the state display-controller.

The invention comprises a radio telephone device comprising: a base unit connected to a wire circuit; a radio telephone set connected to the base unit via a radio circuit; on-hook designation means provided in the radio telephone set for designating an on-hook dialing and transmission operation; state detection means provided in the base unit for detecting a state of the wire circuit on the basis of a signal transmitted from the wire circuit upon the designation of an on-hook dialing and transmission operation; state transmission means for transmitting the state of the wire circuit detected by the sate detection means via the radio circuit to the radio telephone set; and state display means provided in the radio telephone set for visually displaying the state of the wire circuit transmitted by the state transmission means when the on-hook designation means designates the on-hook dialing and transmission operation.

Thereby it is possible to provide a radio telephone device which can realize on-hook dialing wherein the user can perform a calling operation without bringing the transceiver of the radio telephone to his face and can determine the state of a wire circuit by viewing the state display, but wherein the radio telephone device does not increase the size of the radio telephone or shorten the life of the battery.

BRIEF DESCRIPTION OF THE PREFERRED EMBODIMENTS

Embodiments of the present invention will be hereinafter explained in detail with reference to the drawings.

Figure 1:
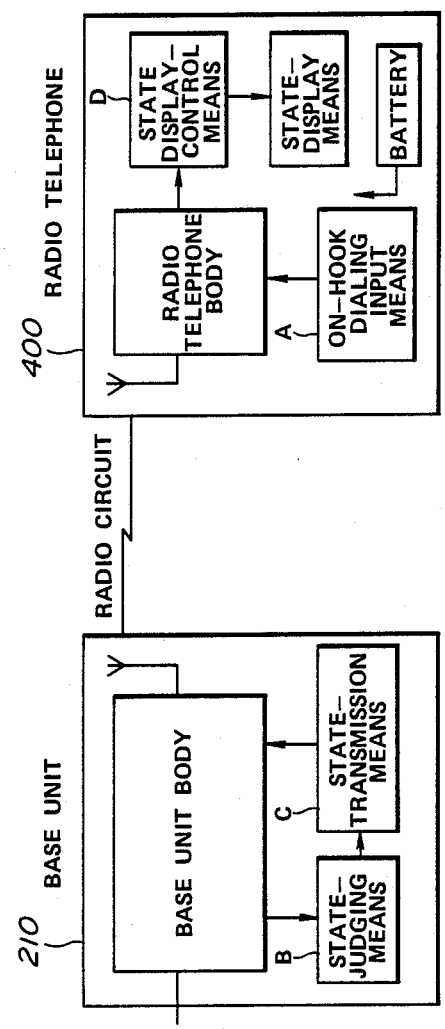
FIG. 1 is a functional block diagram showing a configuration of a radio telephone device of the present invention.

FIG. 1 shows a configuration of the present invention in a functional block diagram, in which there are provided input means A for indicating on-hook dialing, state-detection means B for detecting a state of the wire circuit side, state-transmission means C, and state display-control means D. When on-hook dialing is indicated by the input means A. a state of the wire circuit side is detected from signals arriving from a switchboard after dialing by the state-detection means B, the result of the detection by the state-detection means B is transmitted from a base unit via a radio circuit to a radio telephone by the state-transmission means C, and the state of the wire circuit side transmitted is displayed by using state-display means by the state display-control means D.

On the occasion of performing on-hook dialing, an overload state of the wire circuit is detected by the base unit, the result of the detection is transmitted to the radio telephone, and the state of the wire circuit side is notified by using visible display means of the radio telephone, so that it becomes necessary to provide the radio telephone with a large-sized loudspeaker for monitoring the wire circuit and a driving circuit thereof, resulting in a smaller size of the radio telephone and a longer life of the battery.

Figure 2:
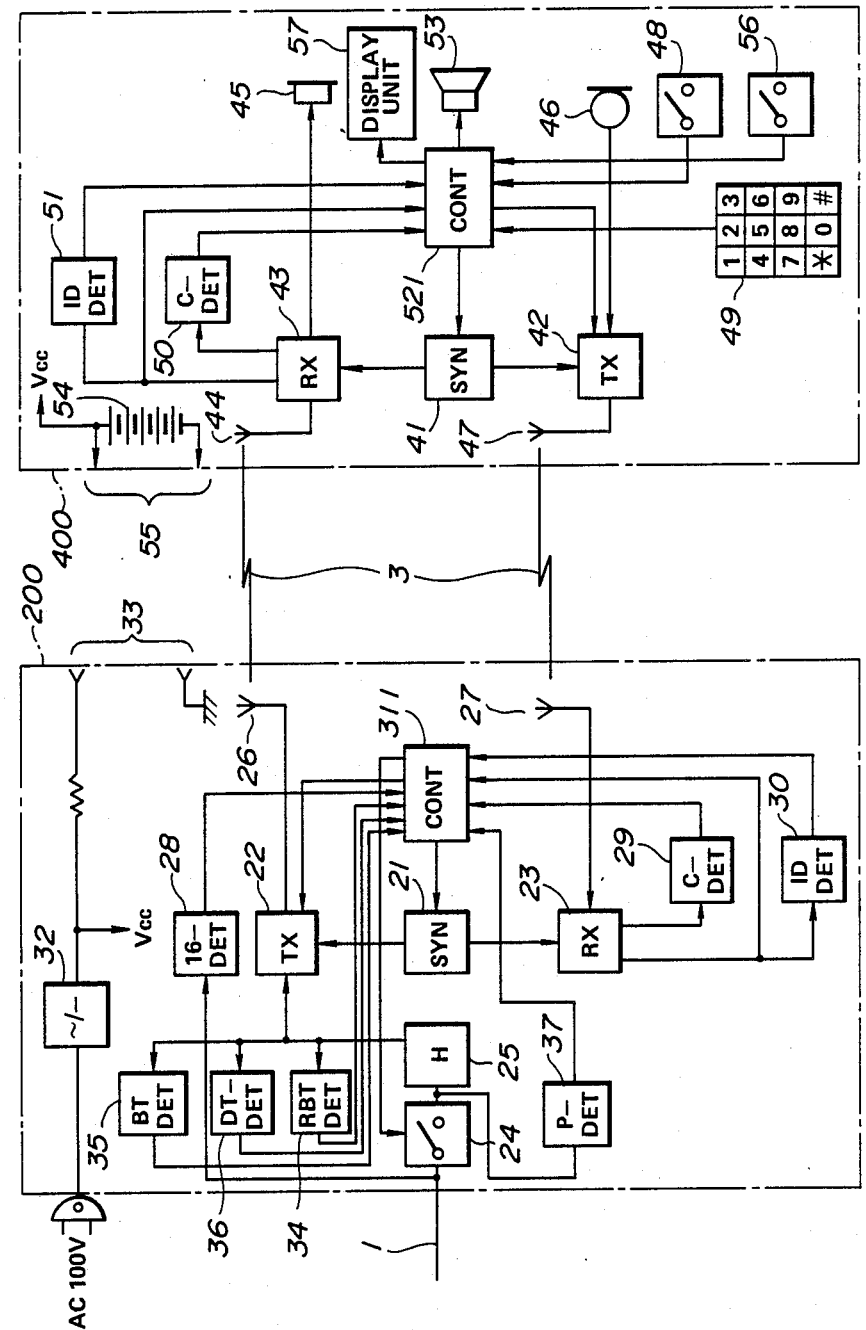
FIG. 2 is a circuit block diagram showing an embodiment of a radio telephone device of the present invention.

FIG. 2 shows a configuration of a radio telephone device in an embodiment of the present invention. In the figure like components as in the above-described FIG. 7 are indicated by like signs and the detailed explanation thereof will be omitted.

Figure 3:
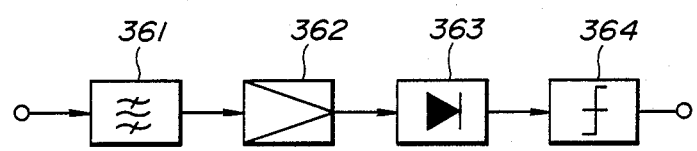
FIG. 3 is a block diagram showing an example of a dialing tone-detection circuit.
Figure 4:
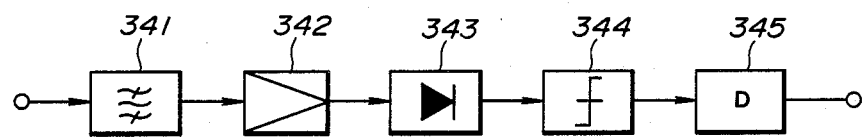
FIG. 4 is a block diagram showing an example of a ringback tone-detection circuit.
Figure 7:
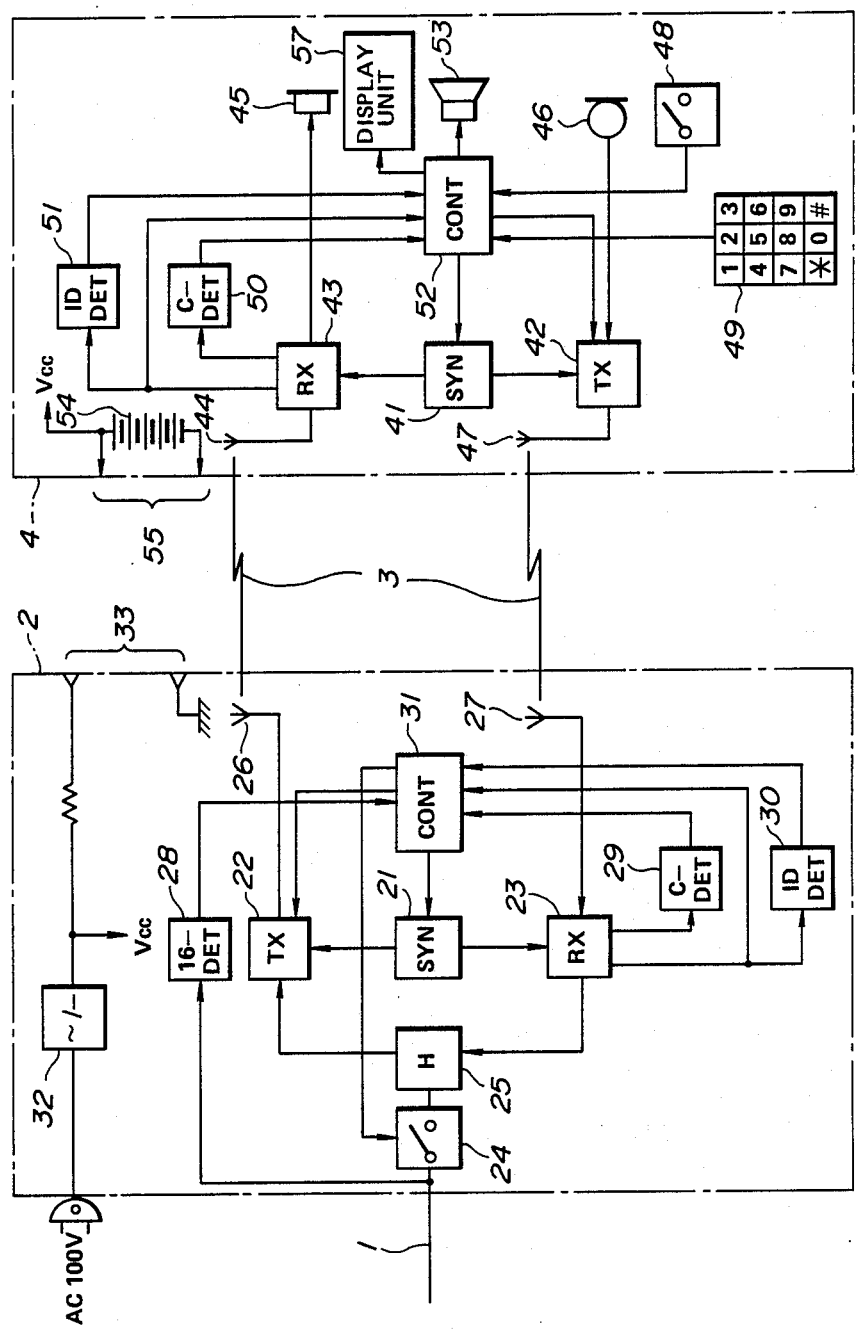
FIG. 7 is a circuit block diagram showing a configuration of a conventional radio telephone device.

In the case unit 200, in addition to the configuration shown in FIG. 7, there are newly provided a dialing tone-detection circuit (DT-DET) 36, a ringback tone-detection circuit (RBT-DET) 34, a busy tone-detection circuit (BT-DET) 35, and a polarity inversion-detection circuit (P-DET) 37. Here, the dialing tone-detection circuit 36 detects, in the case that the contact of the line relay 24 has been closed to constitute a d.c. closed loop between the switchboard via the subscriber's line 1, the presence of a dialing tone arriving from the switchboard for notifying that the switchboard is in an occupied state and it may send out a dialing signal, and is constituted, for example, as shown in FIG. 3. That is, the dialing tone which arrives is first input to a bandpass filter 361 to select, for example, 400 Hz of the dialing tone, and the signal passed is amplified to a level necessary for rectification in an amplifying circuit 362, and then rectified by a rectifying circuit 363. The presence of the dial tone is determined by judging the level of the rectified output by a judging circuit 364, and the judged output is output to a control circuit 311. More particularly, judging circuit 364 generates an output when the rectifier output is equal to or greater than a predetermined value. The ringback tone-detection circuit 34 detects the presence of a ringback tone arriving from the switchboard via the subscriber's line 1 after the sending-out of the dialing signal, and is constituted, for example, as shown in FIG. 4. That is, the ringback tone which arrives is first input to a bandpass filter 341 to select, for example, 400 Hz which is a principal component of the ringback tone, and the signal passed is amplified to a level necessary for rectification by an amplifying circuit 342, and then rectified by a rectifying circuit 343. The presence of the ringback tone is judged by performing level judgment of the rectified output by a judging circuit 344, and the judged output is delayed by a predetermined time by a delay circuit 345 to be output to the control circuit 310 as a detection output. Here, since the ringback tone consists of signals repeatedly sent out for 1 second and switching-off for 2 seconds, the delay tie of said delay circuit 345 is set not smaller than 2 seconds so that the detection output does not cease during the switching-off period. The busy tone-detection circuit 35 detects the presence of the arrival of a busy tone from the switchboard after the sending-out of the dialing signal.

There is newly provided to a radio telephone 400, an on-hook dialing switch 56. The on-hook dialing switch 56 supplies a control circuit 521 with the information on switching.

Next, the operations of the base unit 200 and the radio telephone 400 on the occasion of on-hook dialing will be explained according to the flow charts shown in FIGS. 5 and 6.

Figure 5A:
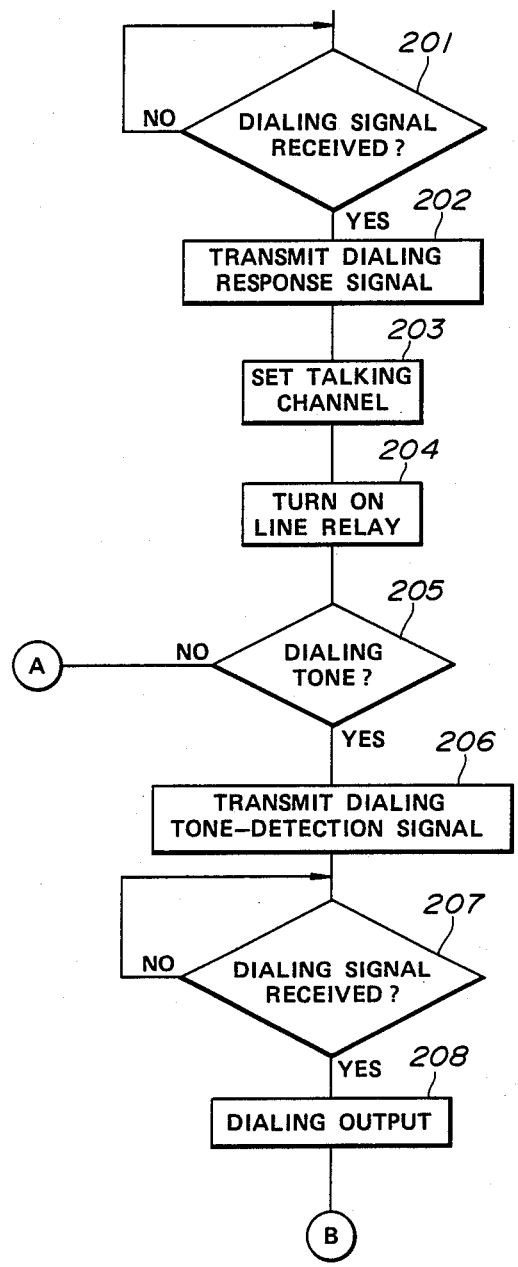
FIG. 5a–5b is a flow chart showing an example of an operation of a base unit on the occasion of on-hook dialing.
Figure 5B:
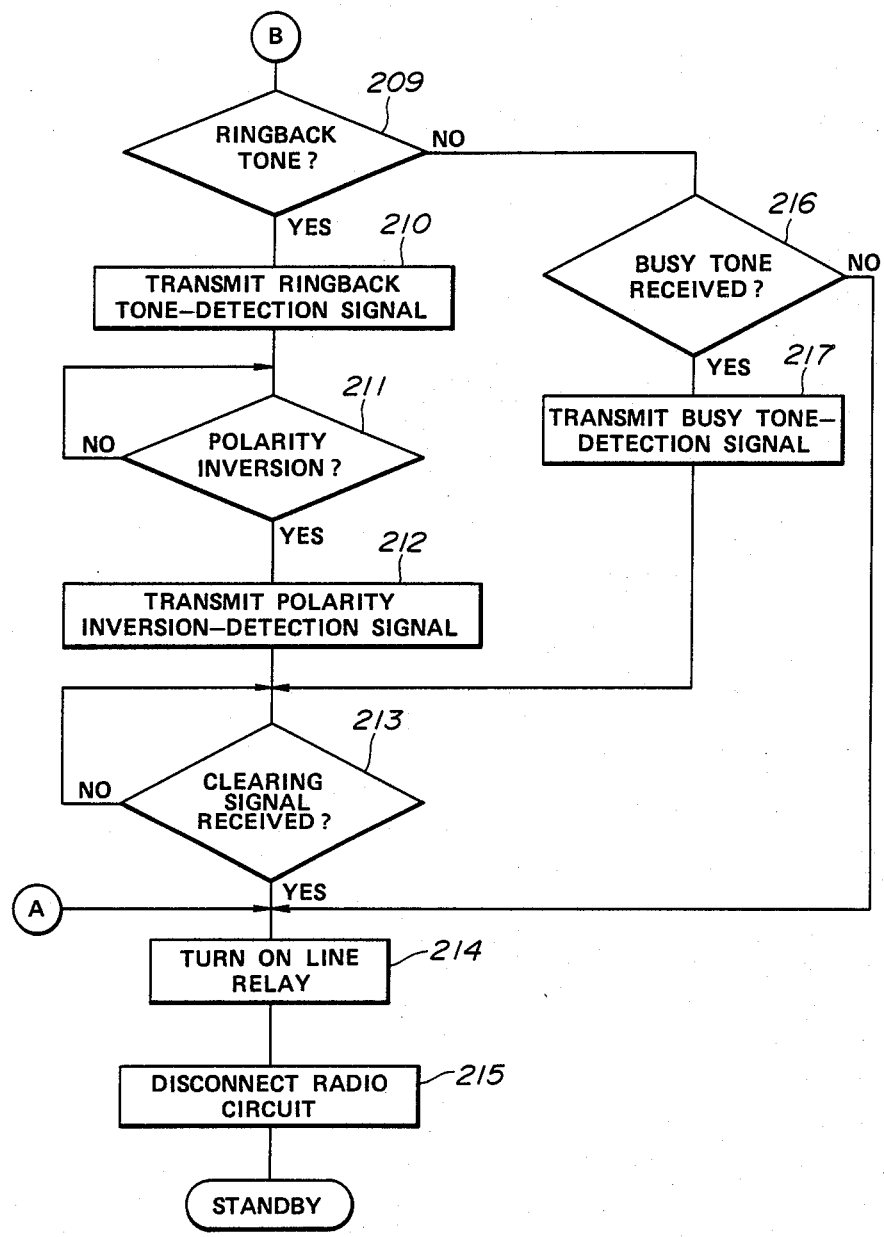
Figure 6A:
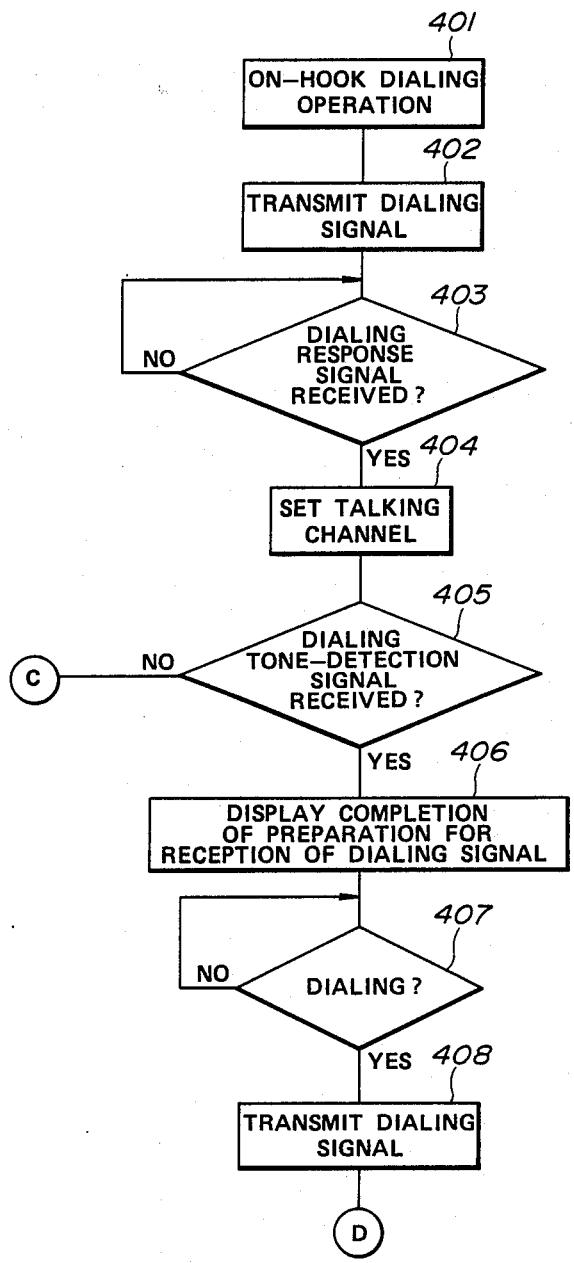
FIG. 6a–6b is a flow chart showing an example of an operation of a radio telephone on the occasion of on-hook dialing.
Figure 6B:
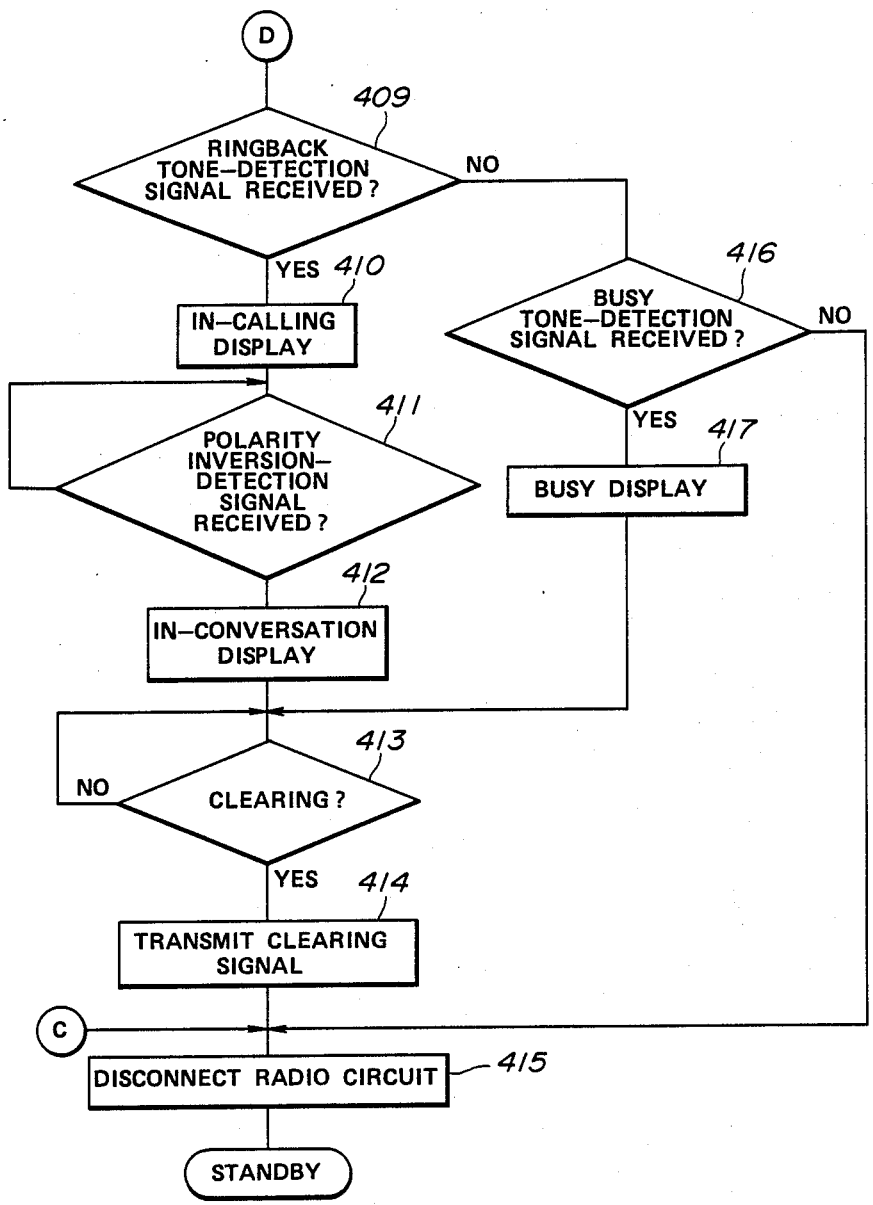

FIG. 6 shows an operation of the radio telephone 400, and FIG. 5 shows an operation of the base unit 200 corresponding thereto. When an on-hook dialing switch 56 of the radio telephone 400 is turned on and on-hook dialing operation is performed in the radio telephone 400 (step 401), the information on the on-hook dialing is transmitted to the control circuit 521. Thereby the radio telephone 400 indicates a specified transmitting and receiving channel (control channel) to the synthesizer 41 by the control circuit 521, thereby continuously operates the transmitter 42 and the receiver 43, and at the same time sends out an ID code and an on-hook dialing signal to the base unit 200 (step 402).

On the other hand, when radio waves arrive from the radio telephone 400, the base unit 200 detects the same by the received electric field-detection circuit 29, and at the same time collates the ID code by the identifying signal-detection circuit 30. When the base unit 200 recognizes that the connection request is to the own unit after the result of the collation, and at the same time confirms the arrival of the dialing signal by the control circuit 311, and retransmits the signal together with the information on the indication of the transmitting and receiving channel (talking channel) from the transmitter 22 to the radio telephone 400 through the control channel (step 202), sets the transmitter 22 and the receiver 23 to the talking channel indicated by the information on the indication by controlling the synthesizer 21 (step 203), and turns off the line relay 24 (step 204).

In the radio telephone 400, when the dialing response signal from the base unit 200 is received (step 403), the transmitter 42 and the receiver 43 are set to the talking channel which corresponds to said information on the indication by controlling the synthesizer 41 in the same way as the base unit 200 (step 404).

The base unit 200 detects whether the dialing tone notifying that the dialing signal may be sent out to the subscriber's line 1 by switching on the line relay 24 is produced or not based on the output of the dialing tone-detection circuit 36 (step 205). When the dialing tone is detected here, the base unit 200 sends out a dialing tone-detection signal from the transmitter 22 (step 206).

When the radio telephone 400 receives the dialing tone-detection signal by the receiver 43 (step 405), the control circuit 521 drives the display unit 57 to display that the radio telephone 400 is in the state of the completion of preparation for receiving the dialing signal (step 406).

Subsequently, when in responding to this display a dialing operation for calling the telephone of the correspondent side, not illustrated, is performed by the operator of the radio telephone 400 with the dial key 49 (step 407), the dialing signal corresponding to this dialing operation are transmitted to the base unit 200 (step 408).

When the base unit 200 receives this dialing signal (step 207), the dialing output corresponding to this dialing signal is performed to the subscriber's line 1 (step 208). In responding to this dialing output, the ringback tone is retransmitted from a switchboard not illustrated which is connected to the subscriber's line 1, and when this is detected based on the output of the ringback tone-detection circuit 34 (step 210), the base unit 200 transmits a ringback tone-detection signal to the radio telephone 400 (step 210).

When the radio telephone 400 receives this ringback tone-detection signal (step 409), it displays on the display unit 57 the fact that the telephone of the correspondent side, not illustrated, is being called (step 410).

When the polarity of the signal of the subscriber's line 1 is inverted by the response of the telephone of the correspondent side, not illustrated, (step 211), the base unit 200 transmits a polarity inversion-detection signal to the radio telephone 400 (step 212).

When the radio telephone 400 receives this polarity inversion-detection signal (step 411), it performs a display of the line being busy display indicating that the line is busy with the telephone of the correspondent side (step 412).

It will be noted that when there is no ringback tone in step 209 of the base unit 200, the detection whether a busy tone exists or not is performed based on the output of the busy tone-detection circuit 35 (step 216), and when busy tone exists, the base unit 200 transmits a busy tone-detection signal to the radio telephone 400 (step 217).

When the radio telephone 400 receives this busy tone-detection signal (step 416), it performs a display of busy indicating that the telephone of the correspondent is busy (step 417).

When the operator of the radio telephone 400 performs the predetermined clearing operation on the occasion of the completion of conversation in the radio telephone 400 or in responding to the display of busy, the clearing operation is detected in the control circuit 521 (step 413), and the radio telephone 400 transmits a clearing signal to the base unit 200 (step 414).

When the base unit 200 receives this clearing signal (step 213), it turns off the line relay 24 (step 214), disconnects the radio circuit (step 215), and becomes in standby state.

The radio telephone 400, after transmitting a clearing signal, also disconnects the radio circuit (step 415), and becomes in standby state.

It will be noted that when there is no dialing tone in step 205 of the base unit 200, it means some kind of abnormality, so that the line relay 24 is turned off (step 214), the radio circuit is disconnected (step 215), and the base unit 205 becomes in standby state. Similarly, when the radio telephone 400 does not detect the reception of the dialing tone-detection signal in step 405, it disconnects the radio circuit (step 45), and becomes in standby state.

Since each state, the occupancy of the switchboard, the in-calling of the subscriber in correspondence, the in-busy of the subscriber in correspondence and the in-response of the subscriber in correspondence, is displayed on the display unit 57 using a liquid crystal display and the like provided to the radio telephone 400, on-hook dialing can be performed in confirming the state.

It will be also noted that as means for performing a display on the display unit 57, picture letter, symbol, letter, sentence and the like, or the combination thereof can be utilized.

What is claimed is:

1. A radio telephone device comprising:
   a base unit connected to a wire circuit;
   a radio telephone set connected to said base unit via a radio circuit;
   on-hook designation means provided in said radio telephone set for designating an on-hook dialing and transmission operation;
   state detection means provided in said base unit for detecting a state of the wire circuit on the basis of a signal transmitted from the wire circuit upon the designation of an on-hook dialing and transmission operation;
   state transmission means for transmitting the state of the wire circuit detected by the state detection means via the radio circuit to the radio telephone set; and
   state display means provided in the radio telephone set for visually displaying the state of the wire circuit transmitting by said state transmission means when said on-hook designation means designates the on-hook dialing and transmission operation.

2. A radio telephone device according to claim 1, wherein said state detection means detects at least one of a preparation completion state in which said radio telephone device is connected to an exchange to enable a dialing signal to be sent to a destination party terminal, a calling state is which said party terminal is being called, a busy-line state in which the party terminal is busy, and a response state in which the destination party terminal has answered.

3. A radio telephone device according to claim 1, wherein said state detection means includes filter means for extracting a tone signal of predetermined frequency from said signal transmitted from said wire circuit, and judging means for generating a detection output when an output of said filter means becomes not less than a predetermined value.

4. A radio telephone device according to claim 1, wherein said state detection means detects a preparation completion state in which a dialing signal is sent to a destination party terminal, on the basis of an output of means for detecting a dialing tone on said wire circuit; a calling state in which said destination party terminal is being called, on the basis of an output of means for detecting a ringback tone on said wire circuit; a busy-line state in which the destination party terminal is busy, on the basis of an output of means for detecting a busy tone on the wire circuit; and a response state in which the destination party terminal has answered, on the basis of an output of means for detecting a polarity inversion of said signal on the wire circuit.

5. A radio telephone device according to claim 1, wherein said state detection means includes means for detecting a polarity inversion of said signal on said wire circuit.

6. A radio telephone device according to claim 1, wherein said state display means includes liquid crystal display means.

7. A radio telephone device according to claim 1, wherein said state display means displays at least a preparation completion state in which a dialing signal can be sent to a destination party terminal, a calling state in which said destination party terminal is called, and a busy-line state in which the destination party terminal is busy.

8. A radio telephone device comprising:
   a base unit connected to a wire circuit;
   a radio telephone set connected to said base unit via a radio circuit;
   on-hook designation means provided in said radio telephone set for designating an on-hook dialing and transmission operation;
   tone-signal detection means provided in said base unit for detecting a tone signal transmitted from said wire circuit;
   polarity-inversion detection means provided in the base unit for detecting a polarity inversion of a signal on the wire circuit;
   judging means for judging a state of said wire circuit on the basis of said detection output of said tone-signal detection means and said detection output of said polarity-inversion detection means and said judging means obtaining a judgment result upon said designation of an on-hook dialing and transmission operation;

transmission means for transmitting said judgment result via said radio circuit to said radio telephone set; and display means provided in said radio telephone set for visually displaying said judgment result of said judging means.

9. A radio telephone device according to claim 8, wherein said tone-signal detection means includes dial-tone detection means for detecting a dial tone from said wire circuit, ringback-tone detection means for detecting a ringback tone from the wire circuit, and busy-tone detection means for detecting a busy tone from the wire circuit.

10. A radio telephone device according to claim 9, wherein said judging means judges a preparation completion state in which said dial tone can be sent to a destination party terminal, on the basis of a detection output of said dial-tone detection means; a calling state in which the destination party terminal is being called, on the basis of a detection output of said ringback-tone detection means; a busy-line state in which the destination party terminal is busy, on the basis of a detection output of said busy-tone detection means; and a response state in which the destination party terminal has answered, on the basis of a detection output of said polarity-inversion detection means.

11. A radio telephone device according to claim 8, wherein said display means includes visual display means.

12. A radio telephone device according to claim 8, wherein said display means displays the state of said wire circuit with use of at least one of picture letters, letters, symbols and sentences.

* * * * *